US011527087B1

(12) United States Patent
Geusz et al.

(10) Patent No.: US 11,527,087 B1
(45) Date of Patent: Dec. 13, 2022

(54) MOBILE APPLICATION FOR AUTOMATIC IDENTIFICATION ENROLLMENT USING INFORMATION SYNTHESIS AND BIOMETRIC LIVENESS DETECTION

(71) Applicant: Idemia Identity & Security USA LLC, Billerica, MA (US)

(72) Inventors: Darrell Geusz, Sterling, VA (US); George C. Huszar, Woodbridge, VA (US); Matthew Thompson, Alexandria, VA (US)

( * ) Notice: Subject to any disclaimer, the term of this patent is extended or adjusted under 35 U.S.C. 154(b) by 57 days.

(21) Appl. No.: 17/139,729

(22) Filed: Dec. 31, 2020

(51) Int. Cl.
| | |
|---|---|
| *G06K 9/36* | (2006.01) |
| *G06K 9/60* | (2006.01) |
| *G06V 30/414* | (2022.01) |
| *G06F 21/62* | (2013.01) |
| *G06F 21/32* | (2013.01) |
| *G06V 30/416* | (2022.01) |
| *G06V 40/16* | (2022.01) |

(52) U.S. Cl.
CPC ............ *G06V 30/414* (2022.01); *G06F 21/32* (2013.01); *G06F 21/6209* (2013.01); *G06V 30/416* (2022.01); *G06V 40/172* (2022.01)

(58) Field of Classification Search
CPC .... G06V 40/16–40/179; G06V 30/416; G06V 10/25; G06V 30/192–30/1988; G06V 40/00–40/70; G06V 30/40–30/43; G06T 2207/30176
See application file for complete search history.

(56) References Cited

U.S. PATENT DOCUMENTS

| | | | |
|---|---|---|---|
| 2007/0164558 A1* | 7/2007 | Wicker | B41M 3/146 283/94 |
| 2016/0057138 A1* | 2/2016 | Hoyos | G06V 40/168 726/7 |
| 2018/0260617 A1* | 9/2018 | Jones | G06K 7/1417 |
| 2021/0004581 A1* | 1/2021 | Bathory-Frota | G06V 30/1448 |
| 2021/0064901 A1* | 3/2021 | Vorobiev | G06F 21/32 |

* cited by examiner

*Primary Examiner* — Brian Werner
(74) *Attorney, Agent, or Firm* — Robert Facey

(57) ABSTRACT

Methods and systems to synthesize information from multiple discrete and unrelated documents, and from the synthesized information verify the identity of an individual to a high degree of trust are described. Information is adaptively synthesized from varied documents, and through generation of document confidence scores. Enrollment requirements for a trusted identification are evaluated in a real-time environment. The enrollment requirements may represent a minimum level of documentation required to sufficiently verify an individual's true identity in order to permit issuance of the trusted identification. Once sufficient documentation has been obtained and validated to meet or exceed enrollment requirements, the documentation (including any original source copies of any documentation) is securely submitted to the trusted identification issuing authority.

17 Claims, 12 Drawing Sheets

Mobile ID Provisioning Flow – Real ID Enrollment Entry Points

ID's Page

More action button

Me Page

US 11,527,087 B1

MOBILE APPLICATION FOR AUTOMATIC IDENTIFICATION ENROLLMENT USING INFORMATION SYNTHESIS AND BIOMETRIC LIVENESS DETECTION

FIELD

This disclosure relates to identification documents and information security.

BACKGROUND

Identification documents are routinely obtained by citizens living in various jurisdictions. However, due to security concerns over database security and identity theft, authentication and verification of identity documents, such as passports and drivers licenses, are still largely conducted through manual, in-person transactions, which causes inconveniences to customers.

SUMMARY

In general, this specification describes methods and systems synthesize information from multiple discrete and unrelated documents, and from the synthesized information verify the identity of an individual to a high degree of trust. Implementations adaptively synthesize information from varied documents, and through generation of document confidence scores, evaluate in a real-time environment attainment of enrollment requirements for a trusted identification. The enrollment requirements may represent a minimum level of documentation required to sufficiently verify an individual's true identity in order to permit issuance of the trusted identification. Once sufficient documentation has been obtained and validated to meet or exceed enrollment requirements, the documentation (including any original source copies of any documentation) is securely submitted to the trusted identification issuing authority.

Implementations evaluate a trust or confidence score of each document by authenticating security information on the document, correlating information from the document with that extracted from other documents (optionally, weighted by the confidence score of the other documents), and verification against original source databases. In some implementations, an original source document is pulled from the document's system of origin (e.g., an ID issuing authority, a business entity, etc.). Data extracted from a document can be verified against the original source copy of the document. Extracted data may only be relied upon to meet enrollment requirements once the extracted data is verified to a predetermined degree of confidence.

The subject matter described in this specification can be implemented in particular embodiments to realize one or more of the following advantages. A mobile application of a computing device or system executes specific computing rules for authenticating a document, verifying information included on the document, verifying the document with an original source of the document, and extracting identifiable information to determine or verify an eligibility status of the person. In some implementations, information obtained from authenticating the document and verifying the document with an original source is used to build a confidence score indicative of the trustworthiness of the extracted identifiable information. The extracted information and confidence from multiple documents, in combination with liveness verified biometrics, are combined to meet trust requirements for verifying a person's identify and enrolling the person in a high-trust system (e.g., Real ID enrollment requirements).

The computing processes described in this document enable a repeatable automated process for effectively combining document authentication with biometric data validation that previously could not be performed by computer systems in an efficient or secure manner. The system uses a specific set of computational rules that consistently and efficiently enable non-local or remote authentication of identification documents and verification of identifiable information included on a document. As such, the described techniques enable a computer to perform operations that the computer was previously unable to perform due to the computational and data security challenges of performing document authentication and validation of biometric data for a subject. This document authentication and validation of biometric data allows the subject the option of remotely presenting identity credentials to facilitate enrollment in a system.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this specification describes methods and systems of using a mobile computing device, such as a smartphone device, to synthesize information from multiple discrete and unrelated documents, and from the synthesized information verify the identity of an individual to a high degree of trust. Implementations adaptively synthesize information from varied documents, and through generation of document confidence scores, evaluate in a real-time environment attainment of enrollment requirements for a trusted identification. The enrollment requirements may represent a minimum level of documentation required to sufficiently verify an individual's true identity in order to permit issuance of the trusted identification. Once sufficient documentation has been obtained and validated to meet or exceed enrollment requirements, the documentation (including any original source copies of any documentation) may be securely submitted to the trusted identification issuing authority. The techniques can be used to validate that all submitted documents are from the same person and that the person presenting the documents is the person whose information is contained on the documents, and if validation is successful, enroll the person with a trusted identification system. For instance, the techniques described herein are described in the context of enrollment for the Federal Real ID program.

Implementations disclosed herein are not merely aimed at automating an otherwise manual process or registration. The mobile application, as described herein, performs authentication of the underlying identification document, thereby enhancing the ability to screen out counterfeit identification documents and improving the robustness of enrollment.

Figure 1:
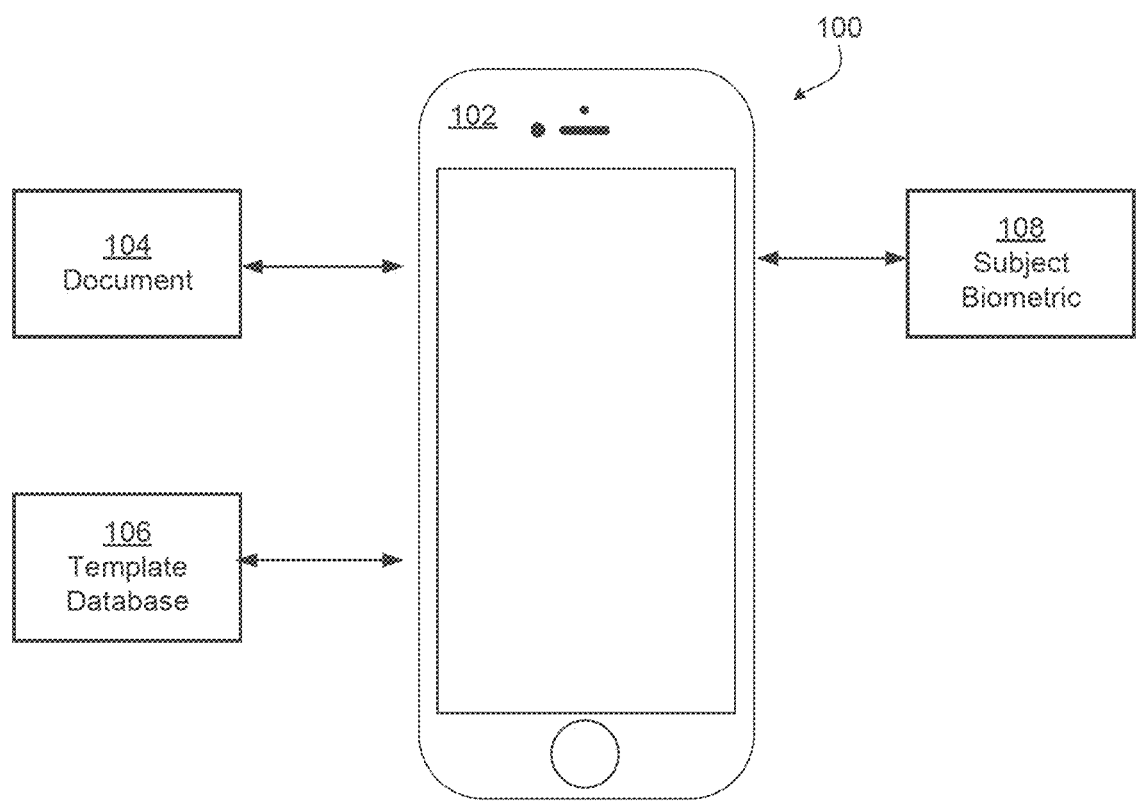
FIG. 1 shows an example of a schematic arrangement in which a mobile computing device is used to authenticate an identification document, verify the personally identifiable information on the identification document, validate an identity assertion of a person, and enroll the person in a system.

FIG. 1 is a schematic diagram illustrating an example of the workflow 100 of using a mobile application to perform subject enrollment by combining document authentication, subject verification, and information aggregation/synthesis. In this illustration, mobile computing device 102 is loaded with, for example, a mobile application. The mobile application utilizes sensor devices on the mobile computing device including a camera device, a microphone device, a fingerprint scanning device, or a retina scanning device. In some implementations, the mobile application uses related scanning and optical devices of a computing device. The scanning and optical devices are configured to obtain data representing biometric or other physical features of a person.

The mobile application authenticates an identification document 104 first. In some examples, the identification document includes a physical identification document, such as a driver's license, a passport, a birth certificate, a visa, a permanent resident card, a social security card, a Medicare/Medicaid card, or a military ID card. The term "identification document" may encompass any government-issued credentials that can be used to assert an identity claim, depending on the purpose and context.

In these examples, a camera device on the mobile computing device may be utilized to authenticate the physical copy. In particular, the camera device may generate a high-resolution image of the identification document. Based on the high-resolution image, various security features from the identification document may be detected, and correlated to determine that the physical copy of the document is a genuine copy as issued by an issuing agency. In some implementations, the physical identification document has multiple layers (e.g., substrate layers) and at least one layer may be referred to as a "blank." This blank layer of the identification document is used to add various personalization features that can correspond to at least one security feature of the document.

To verify or validate that an identification document is authentic, one or more systems or devices described in this document can be configured to authenticate that a blank substrate layer of a physical ID document is a "genuine" layer. For example, a device can scan the identification document to identify or detect the substrate layer. In response to identifying the substrate layer, the device can identify and analyze features of the layer at the document to verify that certain security features and personalization fonts have been placed at the blank substrate layer of the identification document. In some implementations, the device ensures that the features and fonts have been added to the blank layer in accordance with a predefined placement "formula" that is specific to the particular identification card.

In other examples, the identification document includes a digital identification document of, for example, a driver's license, a passport, a birth certificate, a visa, a permanent resident card, a social security card, a Medicare/Medicaid card, or a military ID card. In these examples, the digital image of the digital identification document may be redirected to the mobile application for the authentication purpose. The examples of using a physical copy of a driver's license and the examples of using a digital driver's license are not mutually exclusive.

In some implementations, a template database 106 of current documents from various jurisdictions are referenced, analyzed, or otherwise consulted to determine the authenticity of the underlying document. There may be more than one template per jurisdiction by virtue of concurrent standards endorsed by the jurisdiction. In some examples, the templates may be stored remotely. In these examples, the mobile app may access these templates via a cloud service. In this cloud service example, a comparison engine may be implemented in the cloud. The comparison engine is configured to compare at least two sets of information. The information can be associated with, for example, the identification document 104 and various other types of information for data stored at template database 104, biometrics obtained from a person, or data stored in an example identification database.

In the examples where the templates are stored remotely, the mobile application may be loaded to perform a comparison engine/module to compare the local document with the templates stored remotely. The disposition (including generating a confidence score) can take place either at the mobile app or remotely. For example, information from the local document may be transmitted to a database for comparison with the templates. In some cases, the template data may be resident locally, such as on the mobile computing device. When the security concern is relatively mild, for example, registering for non-profit work outside sensitive majors may rely on local templates, whereas enrolling for employment in defense-related industries may require consultation with a remote database of templates.

When the underlying identification document has been authenticated as a genuine copy, the mobile application may rely on this identification document to validate that the subject attempting to enroll is the person identified by the identification document. As the identification document carries information about the biometrics of the identified person, the mobile application may cause the mobile computing device to collect or obtain a biometric 108 from the subject attempting to register. In some implementations, the mobile application may configure the camera device of the mobile computing device to capture a facial biometric of the subject. To the extent that some implementations incorporate gait analysis, the mobile application may also configure the camera device of the mobile computing device to capture a video clip of the subject's strolling pattern.

In other implementations, the mobile application may prompt the subject to press his or her fingertip(s) on a scanner device so that a fingerprint of one of the fingers can be captured. In still other implementations, the mobile computing device may perform a retina scan by prompting the user to stare into an iris, retina, or eye-scanning device. In these implementations, the eye-scanning device may be onboard the mobile computing device. The eye-scanning device may also be located outside the mobile computing device while remaining in communication with the mobile computing device.

Some implementations may rely on the subject's signature. In these implementations, the mobile application may configure a touch screen of the mobile computing device to capture a signature freshly executed by the subject and then compare the lively captured signature with the information from the identification document that has been authenticated. Some implementations may incorporate voice recognition. For example, the mobile application may configure a microphone device of the mobile computing device to record a speech segment from the subject that is freshly uttered. Thereafter, speaker recognition may be performed based on the lively captured speech segment. For example, extracted parameters from the lively captured speech segment may be compared with known parameters of the subject. In other examples, the lively captured speech segment may be compared with a pre-recorded voice sample from the subject.

These implementations incorporate quality control mechanism to capture biometrics from the subject with sufficient details for comparison with biometric information from the identification document. What is more, the biometrics are captured in a manner that the liveness of such capture is enforced. For example, the facial curvature of a live person can be a basis to determine whether facial portraits taken from various angles on an arc. In some cases, illumination patterns may be modulated and reflections from certain portions of the facial portrait (such as the cornea region) can be analyzed to determine whether corresponding patterns are reflected. These live biometrics may be compared with the biometric information from the identification document.

If the subject is validated as the person identified by the identification document, the mobile application may generate a mobile ID for the individual, such as an electronic version of the individual's driver's license. FIGS. 3A-3E shows exemplary user interface flows for provisioning a mobile application that executes the processes described herein with a Mobile ID.

Figure 2:
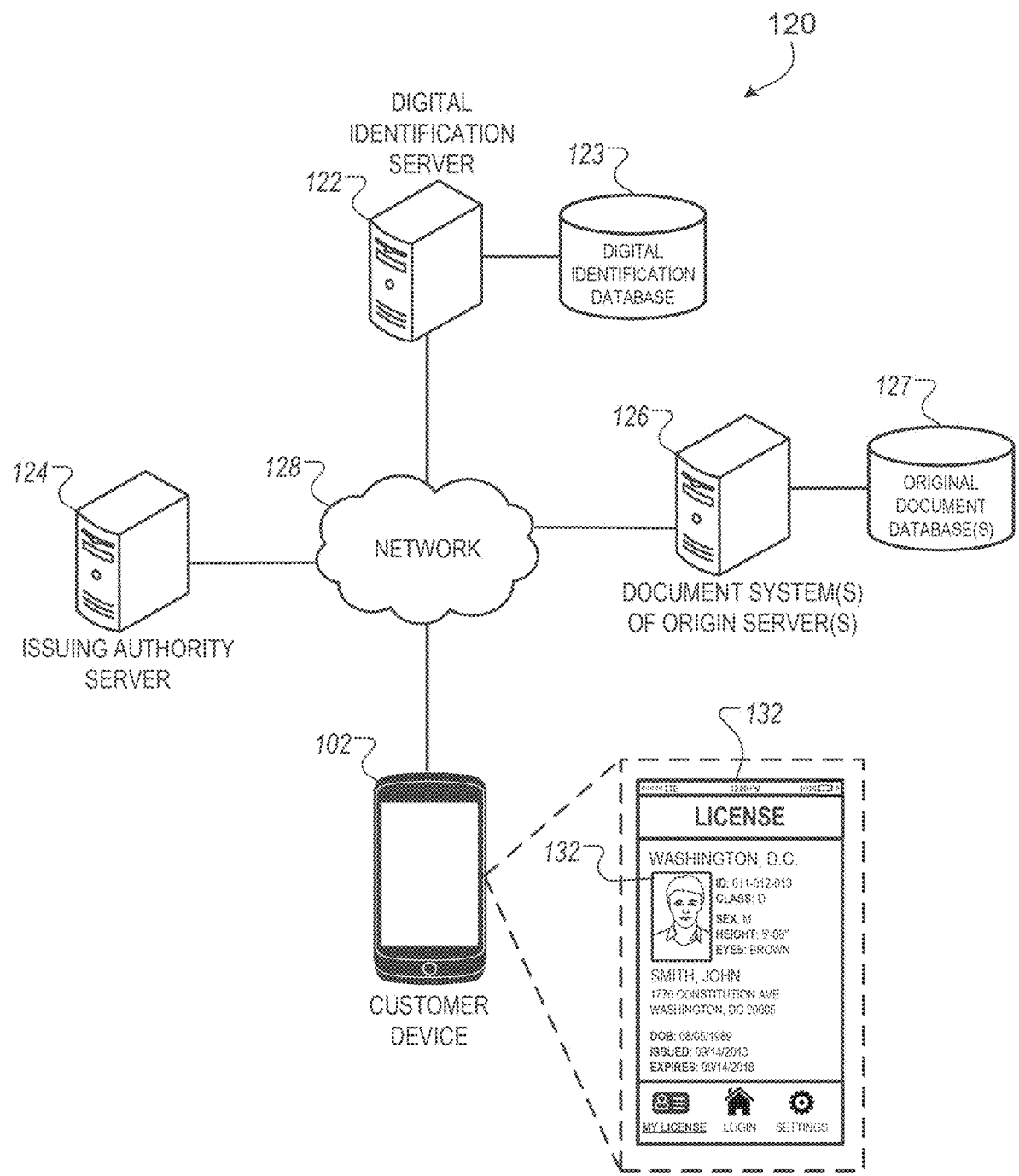
FIG. 2 illustrates a block diagram of an example system for automatic information synthesis and identification enrollment.
Figure 3A:
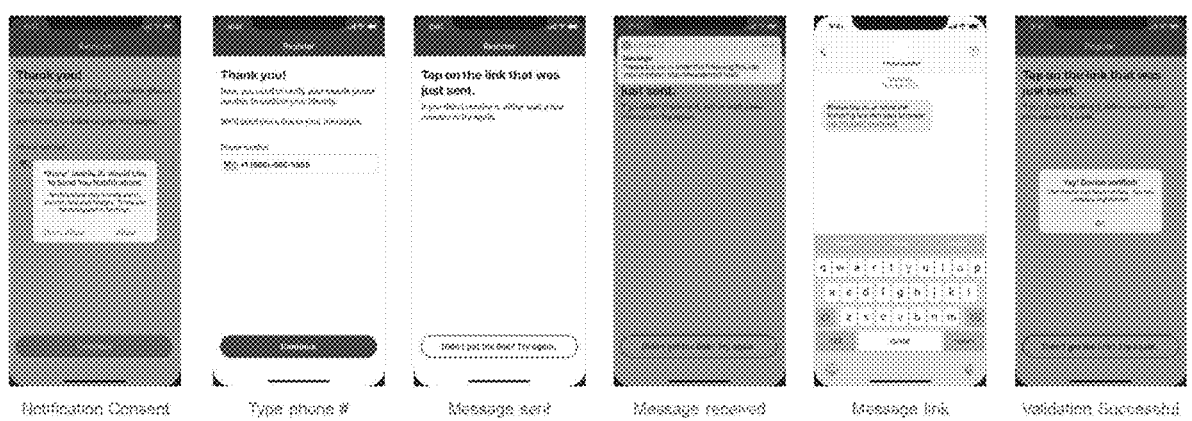
FIGS. 3A-3E shows exemplary user interface flows for provisioning a mobile application that executes the processes described herein with a Mobile ID.
Figure 3B:
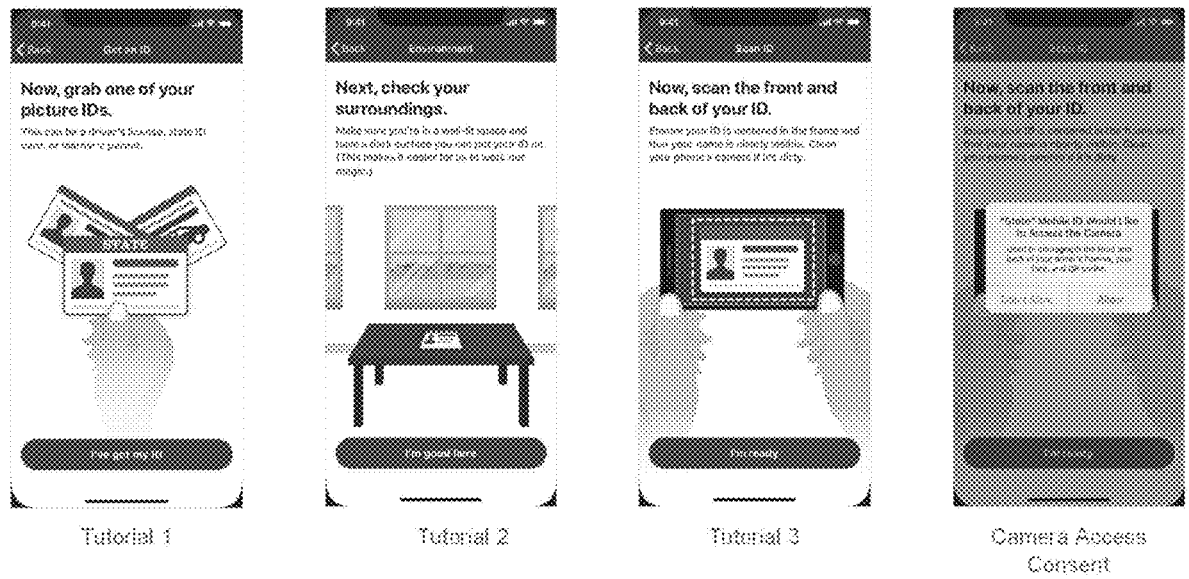
Figure 3C:
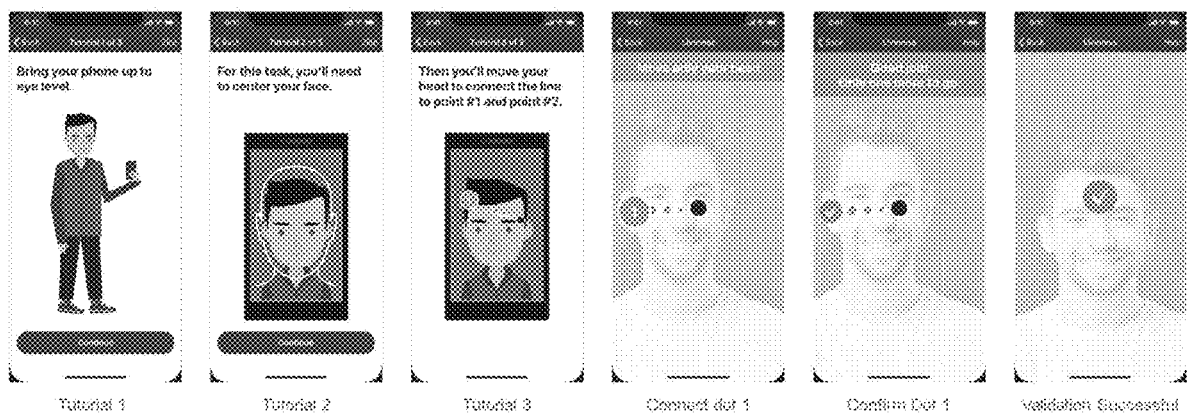
Figure 3D:
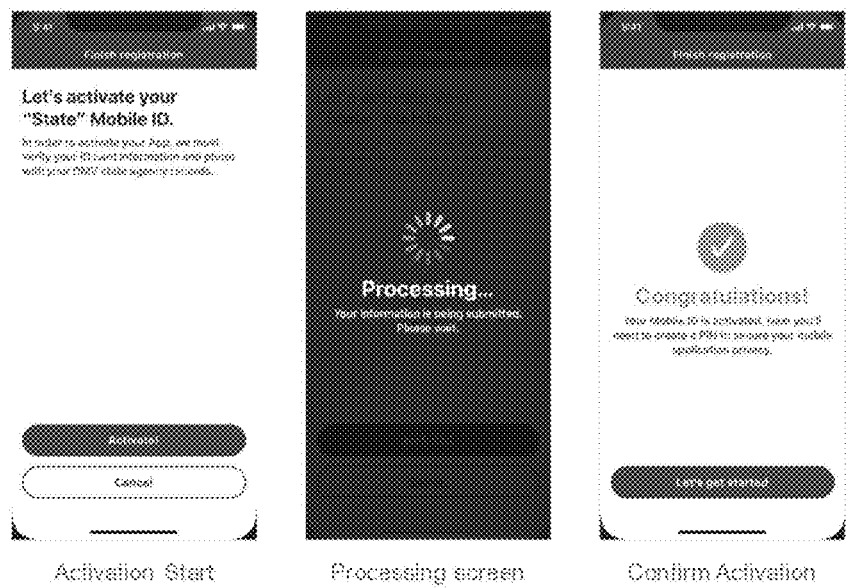
Figure 3E:
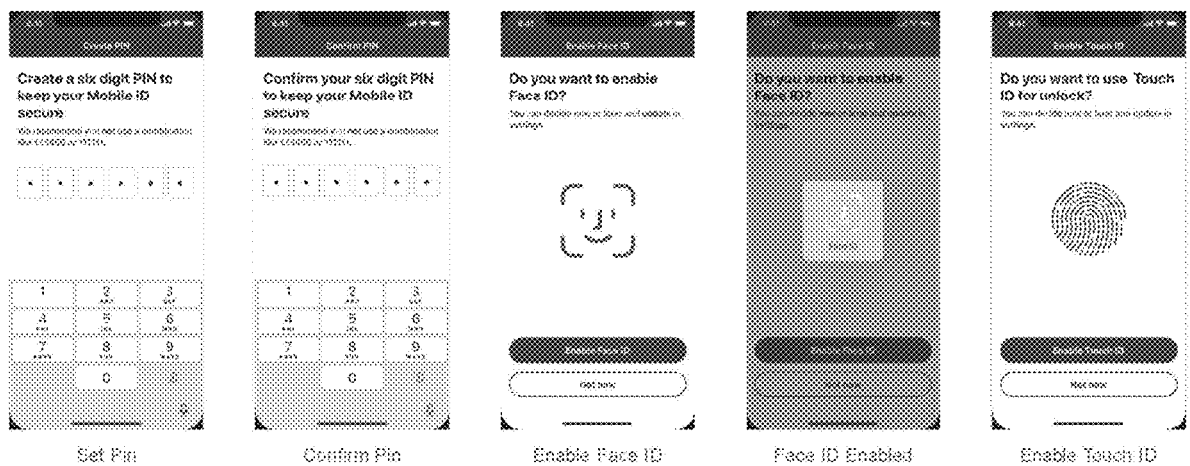

FIG. 2 illustrates exemplary architecture for a system 120 for using the mobile application to aggregate, synthesize documentation, and validate documentation required for enrollment in a highly-trusted version of the Mobile ID. In general, the system 120 may be used for various processes associated with trusted identification enrollment. For instance, the system 100 may be used to enroll customers into a highly-trusted identification program, and provision a digital version of the highly-trusted identification 120 132 (e.g., a Real ID). As another example, the system 120 may be used to enroll customers into a highly-trusted identification program, and submit proper documentation and/or electronic authentication to an issuing authority for a user to obtain a physical or digital version of the highly-trusted identification 132 (e.g., a Real ID).

Briefly, the system 120 includes mobile computing device 102, a digital identification server 122, an issuing authority server 124, document system(s) of origin server(s) 126, and connected over a network 128. The digital identification server 122 is in communications with a digital identification database 123. The document system of origin server 126 is in communications with an original document database 127. In addition, the mobile computing device 102 may display a digital identification 132 on a user interface presented to a user (e.g., a customer or any other authorized user) on the mobile computing device 102. Although the digital identification 132 is depicted as a digital driver license in FIG. 2, the digital identification 132 may alternatively be a digital form of any physical identification card issued to a customer from various types of identification issuing authorities (e.g., a government agency or a company).

FIGS. 4A-4E shows exemplary user interface flows for using the mobile application on the mobile computing device 102 to aggregate, synthesize documentation, and validate documentation required for enrollment in a highly-trusted version of the Mobile ID.

Figure 4A:
FIGS. 4A-4E shows exemplary user interface flows for using the mobile application to aggregate, synthesize documentation, and validate documentation required for enrollment in a highly-trusted version of the Mobile ID.
Figure 4A:
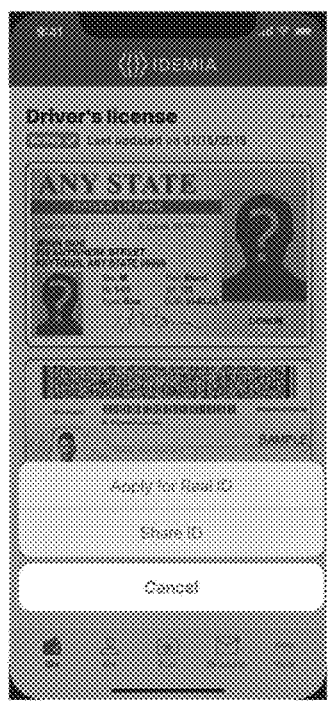
Figure 4A:
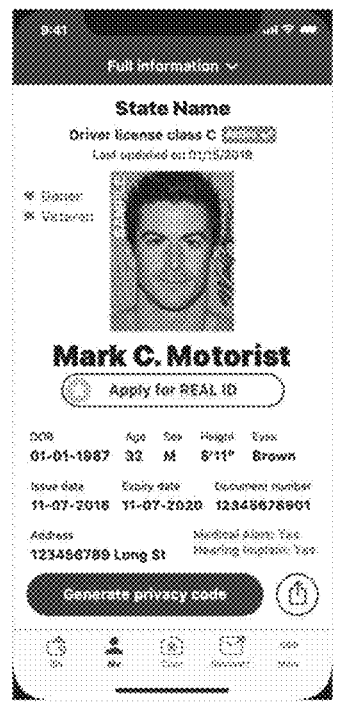
Figure 4B:
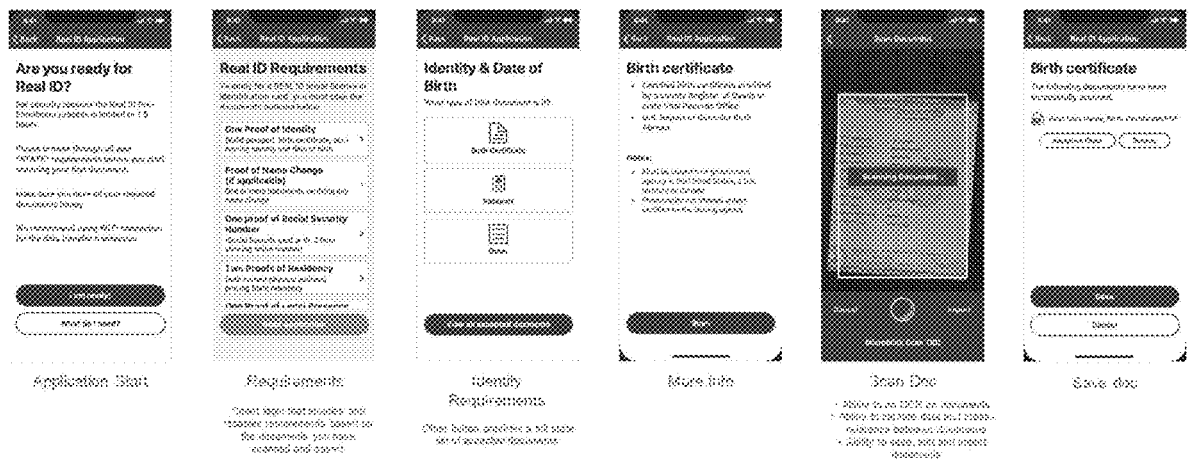

For example, FIG. 4A shows a user interface depicting an individual's digital driver's license. The mobile app provides the user with a user selectable icon to apply for a Real ID version of the electronic driver's license. FIG. 4B depicts a sequence of user interfaces of the mobile app to begin acquiring documentation for the Real ID enrollment. For example, the mobile app presents the user with the enrollment requirements for the Real ID. Each of the requirements is presented as a selectable link. Upon a selection of one of the documentation requirements, the mobile app presents the user with a list of selectable links indicating various types of documents that are acceptable for meeting the selected requirement. For example, in the illustrated interface sequence, the user may have selected the requirement indicated as "One Proof of Identity." Upon receiving this selection, the mobile app displays the interface listing various acceptable documents for proving "Identity & Date of Birth." For instance, the mobile app presents the user with options to scan a birth certificate, an identification card, a passport, or other.

Once the user selects the type of document he wishes to submit, the mobile app activates the camera on the mobile computing device 102 to scan the selected document. Once the document is scanned, the mobile app of device 102 determines the authenticity of the document. For example, the mobile app can analyze information depicted in a high-resolution image of the identification document. In response to analyzing the information depicted in the image, the mobile app can detect or determine that one or more security features are embedded at the document. For instance, for a birth certificate the mobile app may detect a state seal or a watermark. Based on the detected security features, the mobile app can determine the authenticity of the document.

In some instances, older documents, e.g., older birth certificates, may have outdated security features that can be easily forged. In such instances, the mobile app can extract information from the document and determine a source of origin of the document and communicate with the servers 126 of the document's system of origin. Through the mobile app, the device 102 establishes a secure connection with the relevant system of origin servers 126 and can obtain an original copy of the document to verify the authenticity of the document. For example, the mobile app can communicate with the system of origin servers by transmitting data in JavaScript Object Notation (JSON) or Concise Binary Object Representation (CBOR) payloads using a Transport Layer Security (TLS) 1.2 or 2.0 bi-directional connection. In some implementations, the device 102 can verify with the system of origin servers 126 that information printed on the document is accurate and that the document was in-fact issued or generated by the system of origin.

For example, the mobile app can extract the information from the document that identifies its source. For a birth certificate, for instance, the mobile app can extract the identity of the state that issued the birth certificate. The mobile app can communicate with state's vital records database servers to verify the authenticity of the user's birth certificate. As another example, if a user is scanning a utility bill the mobile app can extract the identity of the utility company that issued the bill. The mobile app can communicate with utility company's billing servers or a designated system of record (e.g., a proxy service) through a secure connection to verify the authenticity of the bill and/or the information contained on the bill.

The mobile app can generate an authenticity confidence score that represents the results or outcome of the authentication process. The mobile app can use the confidence score to determine that the identification document is a genuine or authentic identification document issued by a legitimate private or governmental issuing agency. In some implementations, the identification document includes biometric information for a subject. The biometric information can include a visual or digital representation of a person's facial features, eye characteristics, blood type, fingerprint, or other related biometric features. In this implementation, determining that the identification document is a genuine or authentic identification document can also include determining that the biometric information included in the identification document is authentic.

The mobile app can employ a similar process to verify that personally identifiable information on the identification document is current and accurate. In some implementations, the mobile app uses a local or cloud based comparison engine to determine whether the personally identifiable information on the identity document matches current government issued identity records or other records of identity.

Figure 4C:
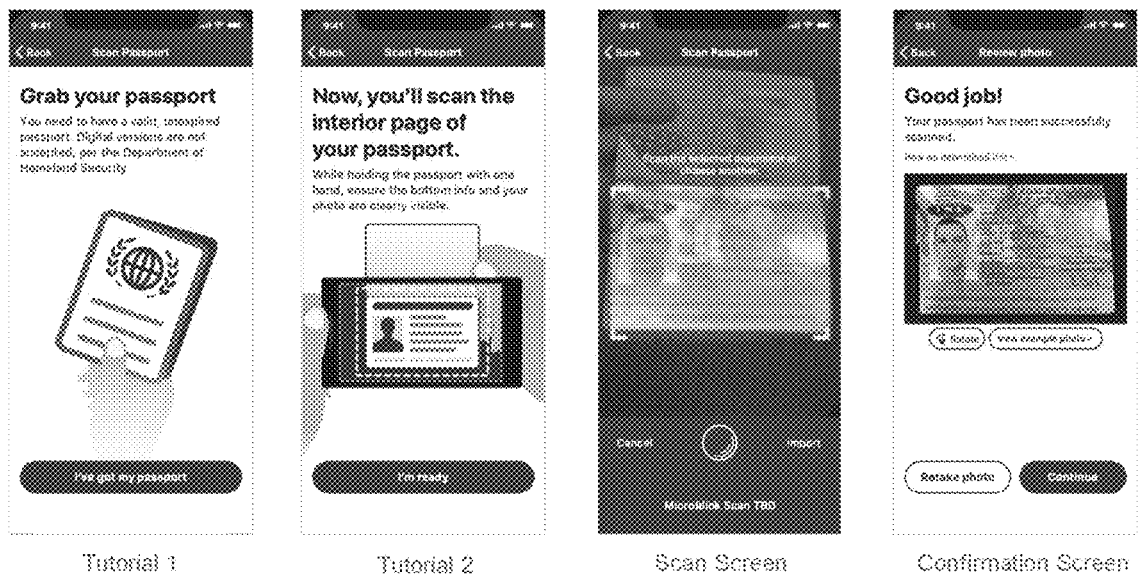
Figure 4D:
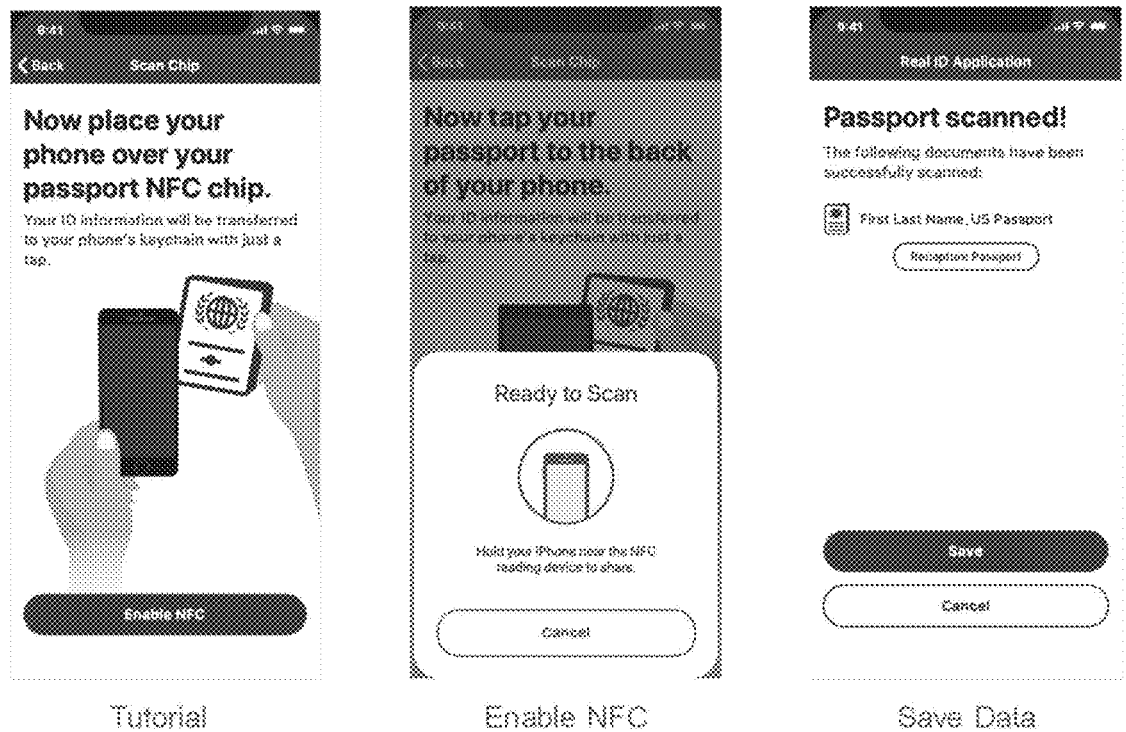

FIGS. 4C and 4D depict a sequence of user interfaces of the mobile app for scanning a document with advanced security features (e.g. a passport). For example, the mobile app prompts the user to optically scan the first page of the passport in FIG. 4C. Then, in FIG. 4D the mobile app prompts the user to scan the NFC chip in the passport. The mobile app can determine whether the security features present on the document are sufficient to self-authenticate the document, or whether further verification must be performed. For instance, in the example of the passport the scan of the first page and NFC chip verification may be sufficient for the mobile app to verify the authenticity of the user's passport without communications with an external system. However, in some examples, the mobile app also may communicate with an issuing authority server 124 of the passport to validate security data contained on the passport's face or from the NFC chip. In some implementations, documents with higher level security features and/or documents for which original copies can be by direct communication between the mobile app and system of origin servers 126 are provided with higher authenticity confidence scores than other documents. In other words, the mobile app generates a document authenticity confidence score based on information including, but not limited to, the type of security features in a document and whether the security features are validated, the type of document, whether data from the document can be verified against an system of origin, whether an original copy of the document can be obtained from a system of origin, and a correlation between the original copy and the scanned document.

Figure 4E:
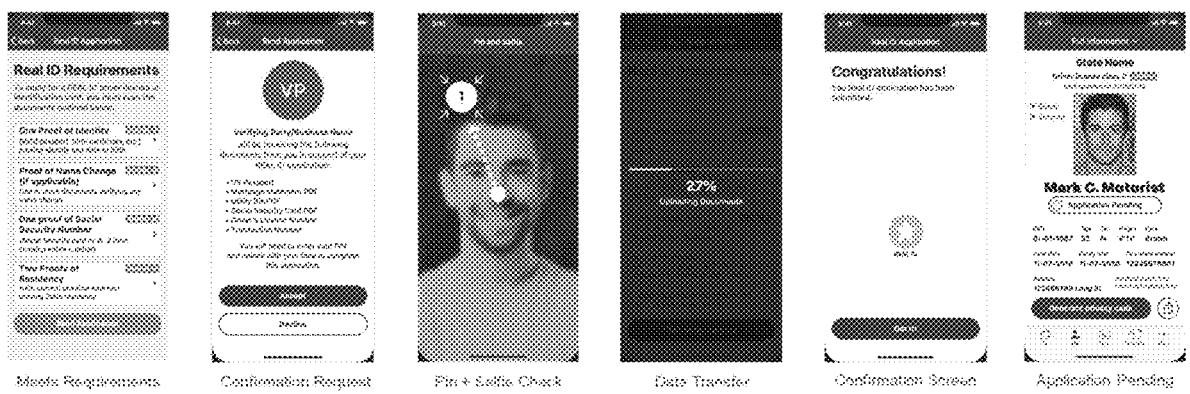

As depicted in the first user interface shown in FIG. 4E, the mobile app adaptively synthesizes the information from a scanned document with that from other previously scanned documents, to evaluate in a real-time environment the attainment of enrollment requirements for a trusted identification. That is, after completion of scanning each document in the mobile app, the compilation of documents are evaluated along weight their respective authenticity confidence scores, to determine which of the enrollment requirements are met. The mobile app provides a graphical indication of which requirements are met and which are still remaining.

In response to determining that the documentation is sufficient to meet the enrollment requirements, the mobile computing device is used to obtain a biometric of the user. For example, an optical scanning device (e.g., a digital camera) of the mobile computing device 102 is used to obtain biometrics data representing one or more biometric features of the user. Subsequently the mobile app of the computing device 102 can use the comparison engine to compare the obtained or captured biometric data with any biometric information available from one or more of the authenticated documents. In some implementations, the obtained biometric is a live biometric represented by biometric data that is obtained in real-time. For instance, as illustrated in the user interface sequence shown in FIG. 4E, the user is prompted to move his face to follow the dotted line while obtaining a selfie image. In response to determining a match between the biometric data and the biometric information from the identification document, the mobile app uses the mobile computing device to prepare the documentation for submission to an enrollment authority. For example, the documents (and any original copies that may have been obtained) can be encrypted and prepared for transmission to a trusted ID issuing authority. Thereafter, the applicant's information may be submitted to the trusted ID issuing authority (e.g., a Real ID issuing authority).

In the above work flow, the human element can be generally removed. Through the use of APIs (or other programming standards), a fully automated paradigm is implemented in which multiple identity management systems are interrogated or operate in tandem to aggregate, authenticate, and verify that the synthesis of documents obtained meet the enrollment requirements for the trusted system.

The technical solution, as disclosed herein, closes the up-front identity gap, which used to be infeasible. These computer techniques implemented on mobile devices can improve workflow to capture previously unrealized potentials. In particular, the process turnaround time can be reduced to achieve responsiveness where identity determination in the context of employment or other privilege can be reliably made in an autonomous manner while improving data accuracy and consistency within enrollment systems.

As described throughout, computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Input devices might also be 3D. Other kinds of devices can be used to provide for interaction with a user as well; for example, feedback provided to the user can be any form of sensory feedback (e.g., visual feedback, auditory feedback, or haptic feedback including tactile feedback and kinesthetic feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving a request to provide an electronic identification document;
   determining a type of the electronic identification document requested;
   determining one or more security features associated with the type of the electronic identification document requested;
   controlling an electronic device to request an image of the electronic identification document;
   receiving the image of the electronic identification document;
   extracting one or more features from the image of the electronic identification document;
   determining whether the one or more features extracted from the image of the electronic identification document satisfy the one or more security features associated with the type of the electronic identification document requested greater than or equal to a confidence threshold level;
   in response to determining that the one or more features extracted from the image of the electronic identification document satisfy the one or more security features associated with the type of the electronic identification document requested greater than or equal to the confidence threshold level:
      controlling the electronic device to request images of a person at a first position and at a second position different than the first position, controlling the electronic device to request images of the person at the first position and at the second position different than the first position comprising:
         controlling the electronic device to display a first region within which a face of the person should be captured; and
         in response to capturing the face of the person in the first region, controlling the electronic device to display a first marker and a second marker and instructions to move the electronic device such that the face of the person is captured moving from the first marker to the second marker;
      receiving the images of the person at the first position and at the second position;
      based on the images of the person at the first position and the second position, validating an identity of the person as being the person to whom the electronic identification document is assigned; and
      transmitting the electronic identification document to a second electronic device.

2. The method of claim 1, wherein determining the one or more security features associated with the type of the electronic identification document requested comprises:
   obtaining a template of the type of the electronic identification document requested; and determining security features associated with the template.

3. The method of claim 1, comprising:
   generating the electronic identification document in response to validating the identity of the person; and
   controlling the electronic device to display the electronic identification document on a display of the electronic device.

4. The method of claim 1, wherein the received image of the electronic identification document, the received images of the person at the first position and at the second position, and the electronic identification document transmitted to the electronic device are included in encrypted communications.

5. The method of claim 1, wherein:
   the second electronic device is a server; and
   the electronic device is a user device.

6. The method of claim 1, wherein:
   the second electronic device is a user device; and
   the electronic device is a server.

7. A non-transitory computer-readable storage medium comprising instructions, which, when executed by a processor, cause the processor to perform operations comprising:
  receiving a request to provide an electronic identification document;
  determining a type of the electronic identification document requested;
  determining one or more security features associated with the type of the electronic identification document requested;
  controlling an electronic device to request an image of the electronic identification document;
  receiving the image of the electronic identification document;
  extracting one or more features from the image of the electronic identification document;
  determining whether the one or more features extracted from the image of the electronic identification document satisfy the one or more security features associated with the type of the electronic identification document requested greater than or equal to a confidence threshold level;
  in response to determining that the one or more features extracted from the image of the electronic identification document satisfy the one or more security features associated with the type of the electronic identification document requested greater than or equal to the confidence threshold level:
    controlling the electronic device to request images of a person at a first position and at a second position different than the first position, controlling the electronic device to request images of the person at the first position and at the second position different than the first position comprising:
      controlling the electronic device to display a first region within which a face of the person should be captured; and
      in response to capturing the face of the person in the first region, controlling the electronic device to display a first marker and a second marker and instructions to move the electronic device such that the face of the person is captured moving from the first marker to the second marker;
    receiving the images of the person at the first position and at the second position;
    based on the images of the person at the first position and the second position, validating an identity of the person as being the person to whom the electronic identification document is assigned; and
    transmitting the electronic identification document to a second electronic device.

8. The non-transitory computer-readable storage medium of claim 7, wherein determining the one or more security features associated with the type of the electronic identification document requested comprises:
  obtaining a template of the type of the electronic identification document requested; and determining security features associated with the template.

9. The non-transitory computer-readable storage medium of claim 7, wherein the operations comprise:
  generating the electronic identification document in response to validating the identity of the person; and
  controlling the electronic device to display the electronic identification document on a display of the electronic device.

10. The non-transitory computer-readable storage medium of claim 7, wherein the received image of the electronic identification document, the received images of the person at the first position and at the second position, and the electronic identification document transmitted to the electronic device are included in encrypted communications.

11. The non-transitory computer-readable storage medium of claim 7, wherein:
  the second electronic device is a server; and
  the electronic device is a user device.

12. The non-transitory computer-readable storage medium of claim 7, wherein:
  the second electronic device is a user device; and
  the electronic device is a server.

13. A system comprising:
  a processor and a storage device storing instructions that are operable and when executed by the processor, cause the processor to perform operations comprising:
    receiving a request to provide an electronic identification document;
    determining a type of the electronic identification document requested;
    determining one or more security features associated with the type of the electronic identification document requested;
    controlling an electronic device to request an image of the electronic identification document;
    receiving the image of the electronic identification document;
    extracting one or more features from the image of the electronic identification document;
    determining whether the one or more features extracted from the image of the electronic identification document satisfy the one or more security features associated with the type of the electronic identification document requested greater than or equal to a confidence threshold level;
    in response to determining that the one or more features extracted from the image of the electronic identification document satisfy the one or more security features associated with the type of the electronic identification document requested greater than or equal to the confidence threshold level:
      controlling the electronic device to request images of a person at a first position and at a second position different than the first position, controlling the electronic device to request images of the person at the first position and at the second position different than the first position comprising:
        controlling the electronic device to display a first region within which a face of the person should be captured; and
        in response to capturing the face of the person in the first region, controlling the electronic device to display a first marker and a second marker and instructions to move the electronic device such that the face of the person is captured moving from the first marker to the second marker;
      receiving the images of the person at the first position and at the second position;
      based on the images of the person at the first position and the second position, validating an identity of the person as being the person to whom the electronic identification document is assigned; and
      transmitting the electronic identification document to a second electronic device.

14. The system of claim 13, wherein determining the one or more security features associated with the type of the electronic identification document requested comprises:
obtaining a template of the type of the electronic identification document requested; and determining security features associated with the template.

15. The system of claim 13, wherein the operations comprise:
generating the electronic identification document in response to validating the identity of the person; and
controlling the electronic device to display the electronic identification document on a display of the electronic device.

16. The system of claim 13, wherein the received image of the electronic identification document, the received images of the person at the first position and at the second position, and the electronic identification document transmitted to the electronic device are included in encrypted communications.

17. The system of claim 13, wherein:
the second electronic device is a server and the electronic device is a user device; or
the second electronic device is a user device and the electronic device is a server.

* * * * *